March 3, 1970  F. J. KUMP  3,498,161
MULTIPLE PURPOSE MACHINE TOOL ATTACHMENT
Filed Feb. 20, 1968  3 Sheets-Sheet 1

*INVENTOR.*
FRED J. KUMP
BY F. Ladermann
ATTORNEY

March 3, 1970 F. J. KUMP 3,498,161
MULTIPLE PURPOSE MACHINE TOOL ATTACHMENT
Filed Feb. 20, 1968 3 Sheets-Sheet 2
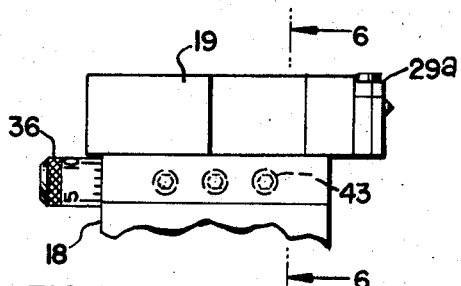
FIG.9
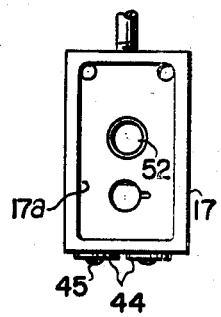
FIG.7
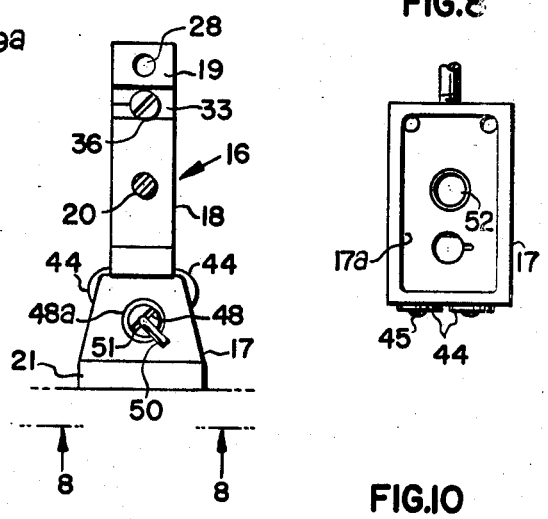
FIG.8
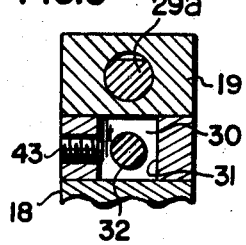
FIG.6
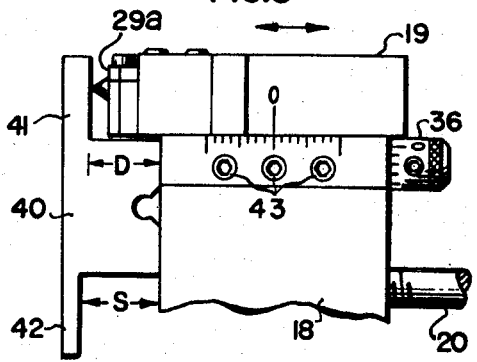
FIG.5
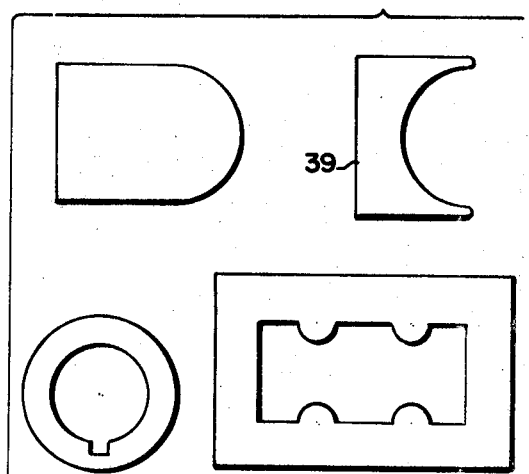
FIG.10
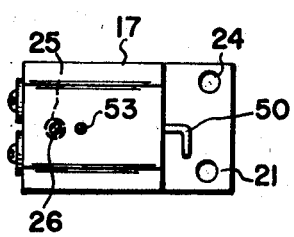
FIG.15
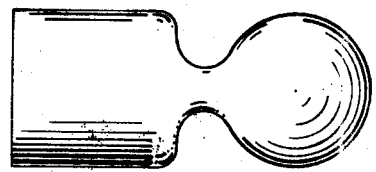
INVENTOR.
FRED J. KUMP
BY J. Lederman
ATTORNEY March 3, 1970 F. J. KUMP 3,498,161
MULTIPLE PURPOSE MACHINE TOOL ATTACHMENT
Filed Feb. 20, 1968 3 Sheets-Sheet 3
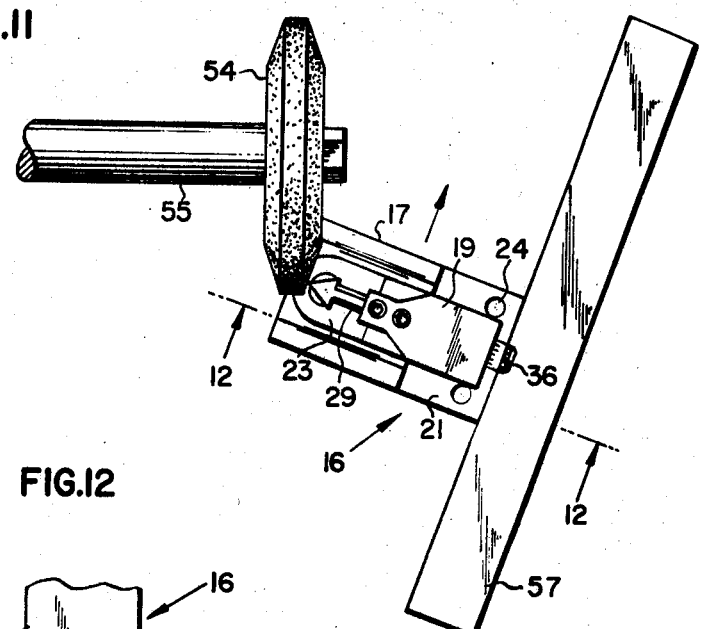
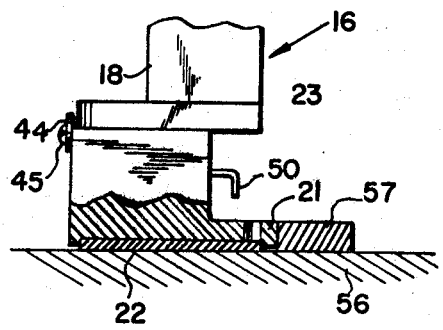
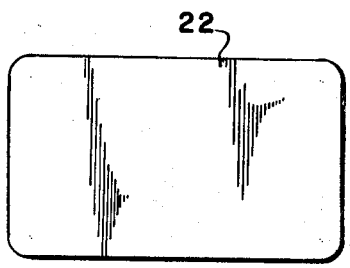
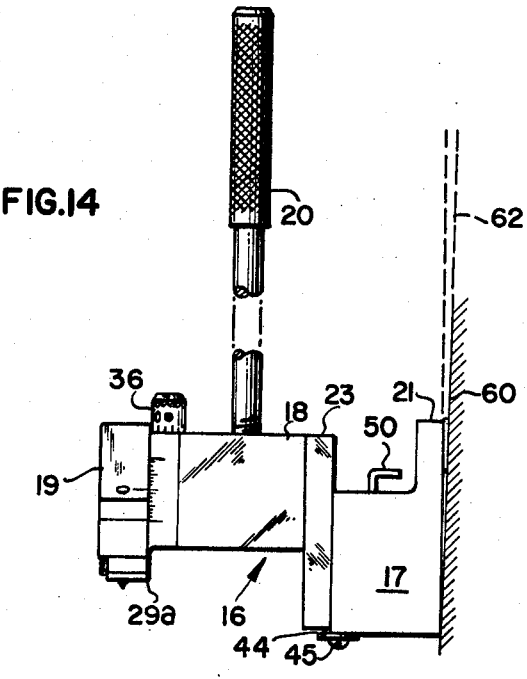
INVENTOR.
FRED J. KUMP
BY
ATTORNEY United States Patent Office 3,498,161
Patented Mar. 3, 1970

3,498,161
MULTIPLE PURPOSE MACHINE
TOOL ATTACHMENT
Fred John Kump, 80—19 88th St.,
Glendale, N.Y. 11227
Filed Feb. 20, 1968, Ser. No. 706,866
Int. Cl. B23b 3/28; B23d 13/02; B28d 1/00
U.S. Cl. 82—12                                    7 Claims

ABSTRACT OF THE DISCLOSURE

A device removably attachable to various machine tools, viz.—to a lathe as a dresser and radius cutter; to a grinder for dressing grinding wheels; to a shaper as the cutter mounted on the clapper box of the reciprocating ram; and, in each instance, providing a self-contained precision instrument of few parts, sturdy and durable in construction, easy to operate and a valuable time saver for tool makers and machinists in general.

---

The present invention relates to machine tools and, more particularly, to a removable attachment adaptable for use in connection with various machines accordingly as to whether the work is spindle mounted as on a lathe or grinder or in a fixed position on the cross-slide of a shaper or like machine.

As a self-contained removable attachment to a lathe the invention functions as a means for cutting radii, convex or concaved, at the free end of a spindle mounted work piece or along the side of the work.

Although the prior art discloses radius cutters mounted for oscillating movement about an axis which, extended, intersects the axis perpendicular thereto of the radius to be cut, it is to be noted that a single pointed tool bit will not cut a total 180° concaved radius. It is, therefore, a main objective of this invention to provide a device of the character described designed to use two interchangeable tool bits, one of which is single pointed for convex radii while the other is a specially formed bit having two spaced diamond points which will cut concaved radii slightly in excess of 180° so that, when a radius of precisely 180° is to be cut there will be no ridge at the line of tangency with a continuing surface.

Another object of the invention is the provision of a set block gage adaptable for use in connection with the above mentioned tool bits.

Another and important object of the invention is the provision of a machine tool attachment that is mounted to stand upright on a horizontal surface when used on a lathe or grinder or turned 90° for attachment to the clapper box on the column forming an integral part of the reciprocating ram of a shaper.

The invention embodies a radius cutter mounted for oscillating movement whereby a curve, concave or convex, may be formed and it is a further object of the invention to provide a simple but effectively operating means to hold the cutter in a fixed, centralized zero position when the machine on which the instant attachment or fixture is mounted is a shaper or like machine tool with the relative movement of cutter and work supporting surface being back and forth in straight line reciprocation.

A further object of the invention is to mape provision for a very fine but easy to read adjustment of the cutter.

And, a still further object of the invention is the provision of a time saving machine tool attachment of the character and for the purposes set forth that is of few parts, inexpensive to manufacture, durable and of rigid construction and easy to operate.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as will fall within the spirit of the invention and scope of the appended claims.

In the drawings:

FIG. 5 is an enlarged fragmentary portion of FIG. 1 showing in elevation the means employed for setting the tool bit in zero position.

FIG. 6 is a vertical sectional detail on line 6—6 of FIG. 9 looking in the direction of the arrows.

FIG. 7 is a vertical sectional view on line 7—7 of FIG. 1 and as seen from the right.

FIG. 8 is a view along line 8—8 of FIG. 7 of a detail to be explained.

FIG. 9 is a view similar to FIG. 5 as seen from the opposite side but drawn to a reduced scale and with the gage block omitted.

FIG. 10 is a plan view showing the various pieces of work in detail that may be cut with the present invention.

FIG. 11 is a top plan of the invention shown in use on a grinder in the process of dressing a grinding wheel.

FIG. 12 is a vertical sectional detail taken along the line 12—12 of FIG. 11.

FIG. 13 is an enlarged plan view of the non-ferrous base plate shown removed from FIG. 12.

FIG. 14 is a side view of the invention, rotated 90° with respect to FIG. 1 and mounted on the upstanding clapper box of a shaper.

Figure 1:
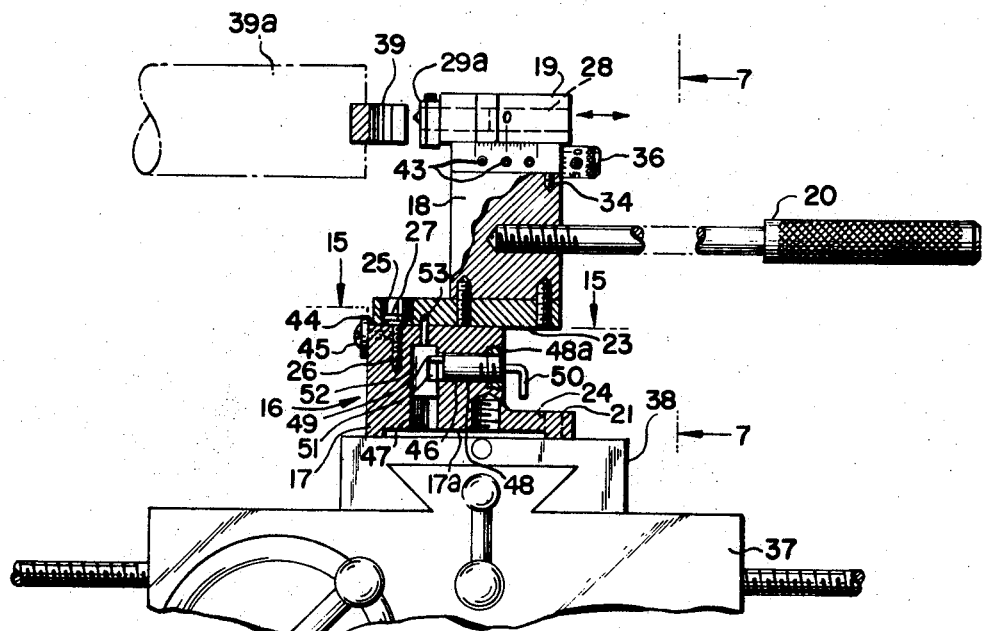
FIGURE 1 is a side elevational view of the invention with the tool bit holder, hereinafter referred to as the head, in zero set position, the body and base portions of the device being partly broken away to show structural details. In this view the invention is shown as mounted in fixed position upon the magnetic cross-slide forming part of the carriage of a conventional lathe.

And, FIG. 15 is a sectional detail taken along the line 15—15 of FIG. 1 looking in the direction of the arrows.

In the drawings like numerals refer to like parts throughout the several views.

With reference to all of the views with the exception of FIGS. 11, 12 and 14:

In structure the invention, indicated generally by numeral 16, comprises a base 17, a body 18 upstanding from and mounted to swivel on the base 17, a tool bit holder or head 19 slidably mounted on the top surface of the body 18 and, extending laterally to the right (FIG. 1) from a side face of the body 18, a manually operable handle 20 for oscillating the body 18 and parts carried thereby through an arc of predetermined radius.

The base 17 is a metal block having squared top and bottom surfaces and end faces, the side faces (FIG. 7) in this instance being inclined. The reduced end extension 21 of base 17 provides extra bearing surface for the base against that of the machine element upon which the attachment is supported. As seen in FIG. 8 the base 17 is recessed at 17a to receive a non-ferrous insert 22 for a purpose to be explained.

The body member 18 overhangs the top of base 17 and includes an arm 23 secured to its bottom surface, this arm extending to the left with respect to FIG. 1 and integrally attached to the body proper by screws 24. The arm 23 slidably contacts the top surface of the base 17 and is fulcrummed on the round head 25 of a bolt 26 threaded into the base and adjustably tightened against a spring washer 27 seated in the counterbore for head 25.

The tool bit holding head 19 is, in this instance, a flat bar slidable endwise on the top surface of the body 18 and having a centralized longitudinally extending bore 28 for slidably receiving a tool bit 29 which may be single pointed or two-pointed, the latter being particularly adapted for concaved radii cutting.

Figure 2:
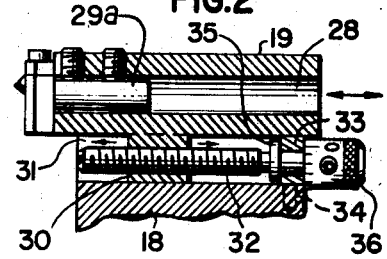
FIG. 2 is an enlarged view, partly in side elevation and partly in vertical central section of the top portion of the invention as shown in FIGS. 1 and 3.

By reference to FIGS. 1 and 2 it will be observed that a lug 30 integral with and depending from the head 19 is guided for sliding movement by the side walls of a slot 31 cut longitudinally across the top of the body 18, that such lug 30 has threaded engagement with a screw 32 rotatably mounted in the aligned bore in a bracket 33 at one end of the slot 31 and secured to the body 18 by screws 34 and that axial movement of the screw is prevented by a shoulder 35 thereon engaging one side of the bracket 33 and a thimble head 36 on the screws 34 engaging the other side. Thus the lug 30 becomes a nut and is the axially movable member when the screw 32 is rotated.

Again referring to FIG. 1 it may here be stated that the invention therein shown is used in connection with a standard type of lathe wherein the cross-slide upon which the cutting tool 16 is securely held in properly adjusted position is magnetic. This obviates the necessity of using clamps or like fastening means and therefore have not been shown. A fragmentary part of a lathe carriage is shown at 37, the cross-slide at 38 and a work piece at 39, it being assumed that the latter is mounted for rotation on a spindle 39a (in phantom lines) extending axially from the headstock also not shown. In setting up the tool attachment 16 it is necessary to make the required horizontal, transverse and vertical adjustments of the said machine parts 37 and 38 to bring the tool bit 29 to the proper height and the axis about which the arm 23 swivels, if extended, into intersection with the axis perpendicular thereto of the radius to be cut.

A single point tool bit 29 is preferably used to cut a convex radius. It will be noticed, however, by reference to FIGS. 3 and 4, that the contour of the head 29 is such that a single point bit will not completely cut a 180° radius. Therefore the instant invention contemplates an alternate tool bit 29a making use of two diamond points spaced apart and equally off center from the axis of the bit.

With reference to FIG. 5 which is full size it will be observed that a linear scale seen at the top of the body 18 is one inch in length with markings 1/16 inch apart and that with the head 19 in neutral, centralized position a zero index line on the head will register with the median mark on the scale. There are twenty-five circumferentially spaced markings on the thimble head 36 and the lead of the thread on screw 32 is such that one complete revolution of the screw will advance the head 19 in one direction or the other 0.0625" (the space between successive markings on the linear scale) accordingly as the thimble is turned to right or left. Reduction of the lead of the screw and a corresponding increase of the spindle markings will give an even finer adjustment to 0.001", if desired.

For precise setting of the instrument in zero position prior to cutting a gage block 40 is held against the body 18 as shown in FIG. 5. This gage 40 has opposing extensions 41 and 42, the extension 41 being used to maintain dimension (D) for spacing the two-point tool bit 29a with relation to the work and turned 180° to maintain dimension (S) for the single point tool bit 29. With the head 19 adjusted to the gage block both scales will register zero.

In the body 18 just below the linear scale and centered with respect thereto is a row of three set-screws 43 two of which will be used to engage the lug 30 and thus hold the head 19 in place when moved to cutting position. The center screw and one other will be tightened accordingly as movement of the head has been to the right or left.

Operation of the device, when employed as an attachment to a lathe, for cutting convex radii on a work piece, is as follows: It is placed on the cross-slide 38 where it is securely held in the position and by means as previously described. The gage 40 is then put to use with its extension 41 uppermost and the head 19 adjusted to bring the tool bit 29a into contact with gage part 41, at which time the scales should both register zero. The radius of a curve to be cut having been predetermined the head 19 is then moved to the right, with respect to FIG. 5, until the index line zero is in proper registry with the linear scale on the body 18. This is done by clockwise rotation of the feed screw 32. For cutting a concave curvature the screw 32 is rotated counter-clockwise whereby the index zero is correspondingly moved to the left of the median line of the linear scale.

Figure 3:
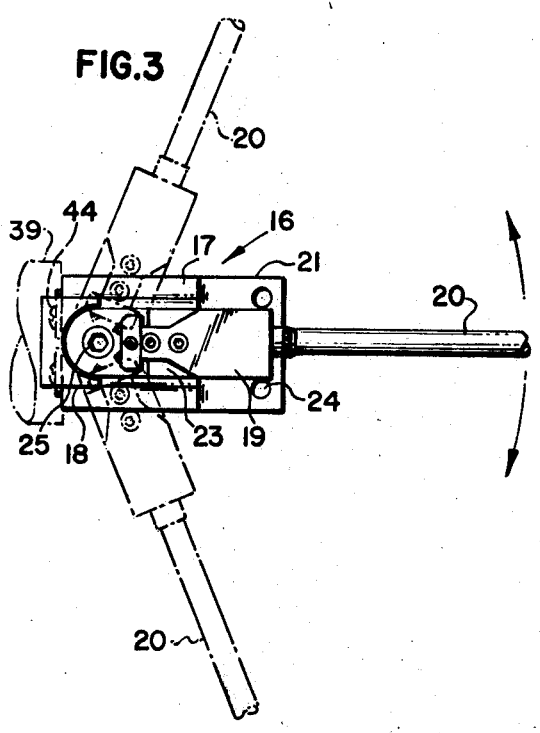
FIG. 3 is a top plan view of the invention removed from the lathe. In this view the handle and parts swingable therewith are seen in phantom lines in extreme angle positions.
Figure 4:
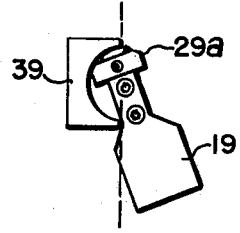
FIG. 4 is a top plan view of the two-point cutter at one end of its arcuate swing.

As shown in FIGS. 1, 3 and 15 it will be observed that a pair of thin washer 44 are secured by screws 45 to the forward end face of the base 17 and project slightly above the top surface of the block. These washers provide stops for limiting oscillation of the device in the manner and for the purpose also previously set forth.

The means provided for locking the device in set zero position and with the handle centralized with respect to the extent of its throw is as follows: There is a horizontal bore 46 extending into the base block 17 as shown in FIG. 1. This bore 46 intersects a vertical bore 47 also in the base 17. In the bore 46 is a cylindrical member 48 having an eccentrically mounted pin 49 projecting from its inner end and provided at its outer end with a retaining collar 48a and suitable handle 50 for effecting partial rotation of the member 48. The pin 49 is slidable in a cam slot 51 in the peripheral wall of cylindrical plunger 52 in the vertical bore 47, the plunger having an axially extending bolt 53 in its upper end adapted to move into and out of an aligned keeper opening in the underside of the pivoted arm 23 adjacent the pivot bolt 26. Thus axial movement of the bolt 53 into and out of locking position is effected by a throw of the handle 50 correspondingly in one direction or the other.

Attention is now directed to FIGS. 11 and 12 which show the invention as an attachment to a grinder and set in position for dressing the beveled edges of a grinding wheel 54 carried on the end of a rotating shaft 55. In this instance the device is not clamped to the surface 56 upon which it stands but is guided for reciprocating movement between two fixed-in-place bars 57 paralleling the surface to be dressed on wheel 54. In this instance the non-ferrous base plate 22 is inserted in the recess 17a as a means for holding the base 17 out of magnetic contact with the supporting surface 56 in the event of the latter being magnetic.

In FIG. 14 the attachment 16 is shown in position for use on a shaper or like machine tool. In this instance the device is rotated as a whole 90° with respect to the upstanding position in which it is shown in FIG. 1, the base 17 being magnetically or otherwise held in fixed position on the face of the clapper box 60 carried on the reciprocating ram, not shown, of the shaper, the clapper box being indicated by cross sectioning. A shim shown in dotted lines at 62 will tip the device slightly to provide a proper rake on the tool bit seen at 29.

From the foregoing it is believed that the construction and operation of the invention have been sufficiently described as to call for no further explanation.

What I claim is:

1. A radius dresser and cutter comprising a base, an arm having swivel connection at one end to said base, a body integral with and upstanding from the other end of said arm, a tool bit holding head mounted on said body and having a longitudinally extending bore the axis of which is perpendicular to and intersects the extended axis of said swivel connection, said body having an upwardly opening transverse slot in its upper end, a lug depending from said head and guided for reciprocating movement in said slot, a feed screw mounted to rotate in said slot and threaded through said lug, said lug comprising a nut axially movable on rotation of said screw, a handle for oscillating said arm and the parts carried thereby through an arc of predetermined radius, and means for locking the cutter in a centralized position with regard to the ends of its oscillating movement, said base including a block portion and an extended foot portion which together provide an elongated bearing surface for the device, the pivoted end of said arm being rounded, the other end of said arm and said upstanding body overhanging said block, and said block providing a housing for said locking means.

2. A device according to claim 1 wherein said locking means includes a horizontal cylinder rotatable in said block, an eccentrically mounted pin projecting from the inner end of said cylinder and a handle from its other end, a roller threaded into the bore for said cylinder for holding the cylinder against axial movement, a vertically positioned plunger having a cam slot in its peripheral surface for slidingly engaging said pin and a bolt projecting upward from said plunger the said arm having an aperture into and out of which said bolt is movable by the actuating of said handle.

3. A device according to claim 1 characterized by said feed screw including a thimble head provided with a peripheral scale, a linear scale on a side face of said body, a zero marked index on the corresponding side face of said slidably mounted head, three set screws in said body spaced equally apart in a horizontal row directly under said linear scale, the axis of the center screw being normally in line with the said zero index, the center screw and one or the other of the outer screws being the ones set against the said lug accordingly as the said index is moved to the right or left respectively of the median line of said linear scale.

4. The combination with a device according to claim 3 of a gage block having two gaging measurements, one or the other of which is used accordingly as the tool bit in said head is single or double pointed.

5. A radius dresser and cutter according to claim 1 wherein stops are provided for limiting the throw of said handle to 180° or slightly more when cutting a concave curvature, the said stops comprising a pair of spacers, as washers, removably attached to the appropriate end face of said base.

6. As a removable attachment to a grinder including a rotatable spindle, a grinding wheel on said spindle, a magnetic cross slide and guiding means adjustable to a fixed position on the surface of said slide, a device according to claim 1 wherein a tool bit in the said head is the cutting means for dressing said wheel, the bottom surface of said base being recessed to removably receive a spacer of non-ferrous material for the purpose set forth.

7. As a removable attachment to a shaper including a reciprocating ram and clapper box thereon, a device according to claim 1 wherein the said base is secured to said clapper box, with the said body of the device in perpendicular relation to the box.

References Cited
UNITED STATES PATENTS 1,626,936  5/1927  Ingram _____ 82—12
2,460,342  2/1949  Feaster _____ 82—12 XR LEONIDAS VLACHOS, Primary Examiner U.S. Cl. X.R.
90—54; 125—11